(12) United States Patent
Shumate

(10) Patent No.: US 11,920,607 B2
(45) Date of Patent: *Mar. 5, 2024

(54) IMPELLER ASSEMBLY FOR USE IN AN AQUARIUM FILTER PUMP AND METHODS

(71) Applicant: Spectrum Brands, Inc., Middleton, WI (US)

(72) Inventor: John L. Shumate, Shawsville, VA (US)

(73) Assignee: Spectrum Brands, Inc., Middleton, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/143,745

(22) Filed: May 5, 2023

(65) Prior Publication Data

US 2023/0272803 A1    Aug. 31, 2023

Related U.S. Application Data

(63) Continuation of application No. 17/838,909, filed on Jun. 13, 2022, now Pat. No. 11,680,579, which is a continuation of application No. 16/811,700, filed on Mar. 6, 2020, now Pat. No. 11,365,746, which is a continuation of application No. 15/863,535, filed on Jan. 5, 2018, now Pat. No. 10,584,713.

(51) Int. Cl.
| | |
|---|---|
| *F04D 29/24* | (2006.01) |
| *A01K 63/04* | (2006.01) |
| *F04D 29/22* | (2006.01) |
| *F04D 13/06* | (2006.01) |

(52) U.S. Cl.
CPC .......... *F04D 29/242* (2013.01); *A01K 63/045* (2013.01); *A01K 63/047* (2013.01); *F04D 29/2261* (2013.01); *F04D 29/24* (2013.01); *F04D 13/06* (2013.01)

(58) Field of Classification Search
CPC .. A01K 63/042; A01K 63/045; A01K 63/047; F04D 29/242; B01F 3/04531
See application file for complete search history.

(56) References Cited

U.S. PATENT DOCUMENTS

| | | | |
|---|---|---|---|
| 993,679 | A | 5/1911 | Hayes |
| 2,238,749 | A | 4/1941 | Peltier |
| 2,869,951 | A | 1/1959 | Wooster |
| 3,186,011 | A | 6/1965 | Decker |
| 3,481,531 | A | 12/1969 | Macarthur et al. |
| 3,782,853 | A | 1/1974 | Frister |
| 4,411,598 | A | 10/1983 | Okada |
| 4,606,103 | A | 8/1986 | Koehl et al. |

(Continued)

FOREIGN PATENT DOCUMENTS

DE    2734479 A1    2/1979

OTHER PUBLICATIONS

International Search Report and Written Opinion for Application No. PCT/US2019/012069 dated Apr. 1, 2019, 13 pages.

*Primary Examiner* — Courtney D Heinle
*Assistant Examiner* — Andrew J Marien
(74) *Attorney, Agent, or Firm* — Merchant & Gould P.C.

(57) ABSTRACT

An impeller for use in an aquarium filter pump includes a shaft and a plurality of impeller blades radially extending from the shaft. Each of the impeller blades includes opposite blade faces. A depression is in each of the blade faces and aids in pushing the water. The depression can be a variety of shapes and can have its deepest portion along one of the edges of the blade.

12 Claims, 13 Drawing Sheets

(56) References Cited

U.S. PATENT DOCUMENTS

| | | | |
|---|---|---|---|
| 4,720,242 | A | 1/1988 | Lovisetto |
| 4,792,275 | A | 12/1988 | Weinrib |
| 4,817,561 | A | 4/1989 | Byrne et al. |
| 4,861,468 | A | 8/1989 | Willinger et al. |
| 5,112,192 | A | 5/1992 | Weetman |
| 5,238,367 | A | 8/1993 | Ellis et al. |
| 5,282,961 | A | 2/1994 | Ellis et al. |
| 5,603,831 | A | 2/1997 | Hickok |
| 6,082,890 | A | 7/2000 | Heinzmann et al. |
| 6,428,281 | B1 | 8/2002 | Botrel et al. |
| 6,802,695 | B2 | 10/2004 | Haller |
| 6,857,392 | B1 | 2/2005 | Shyu |
| 7,040,860 | B2 | 5/2006 | Newman et al. |
| 8,231,342 | B2 | 7/2012 | Lacey et al. |
| 8,770,941 | B2 | 7/2014 | Smith |
| 8,777,564 | B2 | 7/2014 | Zeng et al. |
| 8,790,088 | B2 | 7/2014 | Dyer et al. |
| 8,882,470 | B2 | 11/2014 | Unger |
| 8,905,704 | B2 | 12/2014 | Sauer |
| 2007/0251866 | A1 | 11/2007 | Wong |
| 2010/0316497 | A1 | 12/2010 | Feichtinger et al. |
| 2014/0003929 | A1 | 1/2014 | Favre et al. |
| 2014/0086754 | A1 | 3/2014 | Seiji et al. |
| 2014/0348675 | A1 | 11/2014 | Guo et al. |
| 2017/0122324 | A1 | 5/2017 | Meuter |
| 2019/0151782 | A1 | 5/2019 | Himes et al. |

IMPELLER ASSEMBLY FOR USE IN AN AQUARIUM FILTER PUMP AND METHODS

CROSS REFERENCE TO RELATED APPLICATIONS

This application is a continuation of U.S. patent application Ser. No. 17/838,909, filed Jun. 13, 2022 which is a continuation of U.S. patent application Ser. No. 16/811,700, filed Mar. 6, 2020 which issued as U.S. Pat. No. 11,365,746, which is a continuation of U.S. patent application Ser. No. 15/863,535, filed Jan. 5, 2018, which issued as U.S. Pat. No. 10,584,713 which are incorporated herein by reference in their entirety.

TECHNICAL FIELD

This disclosure relates generally to devices and methods for filtering aquarium water. More specifically, this disclosure relates to an improved impeller for use an aquarium filter pump.

BACKGROUND

To maintain an ecological balance within an aquarium, it is necessary to keep the water in the aquarium clean. Cleaning is often accomplished by pumping water from the aquarium to a filter device. The filter device will clean the water by having it pass through a filter medium, and then the cleaned water is returned to the aquarium. Such filtering devices generally include an internal pump driven by an electric motor for pumping the water through the filter medium. Improvements are desirable by increasing the flow rates through the pump, without increasing the impeller size to allow for compact impeller designs.

SUMMARY

An impeller for use in an aquarium filter pump that improves the prior art is provided.

An impeller includes a shaft and a plurality of impeller blades radially extending from the shaft. Each of the impeller blades includes opposite blades faces; a free edge remote from the shaft; first and second opposite edges extending from the shaft to the free edge, wherein the blade faces are bordered by the first and second edges and the free edge; and a depression in each of the blade faces. The depression is at a maximum depth within the respective blade face at one of the edges.

In example embodiments, the shaft has a longitudinal axis, and each blade is along a plane containing the first and second edges. Each plane also contains the longitudinal axis of the shaft.

In many examples, the free edge, first edge, and second edge, are straight edges.

In some embodiments, the depression has a periphery with a shape of two opposite parallel sections that round to a vertex region.

In examples of depressions that have a vertex region, in some implementations, the vertex region is adjacent to the shaft, and the free edge is a deepest portion of the depression.

In some implementations, the depression has a periphery forming a curved shaped with a vertex region adjacent the first edge, and the second edge is a deepest portion of the depression.

For some embodiments, the depression increases in depth as the depression extends from adjacent the shaft to the free edge.

In some embodiments, there are no more than four blades.

In some embodiments, there are at least three blades and no more than four blades.

In another aspect, an impeller assembly for use in an aquarium filter pump is provided. The impeller assembly includes a shaft with a longitudinal axis, a rotor mounted on the shaft, and an impeller mounted on the shaft. The impeller has at least three blades radially extending from the shaft. Each blade is along a plane containing the longitudinal axis of the shaft. Each blade has an opposite blade face. Each blade has straight, opposite first and second edges extending from the shaft and a straight free edge extending between the first and second edges. Each blade face has a depression.

In some examples, the depression has a periphery with a shape of two opposite parallel sections that round to a vertex region.

In some examples, the vertex region is adjacent to the shaft, and the free edge is a deepest portion of the depression.

In some examples, the depression has a periphery forming a curved shaped with a vertex region adjacent the first edge, and the second edge is a deepest portion of the depression.

In some implementations, the depression increases in depth as the depression extends from adjacent the shaft to the free edge.

In another aspect, a method of pumping water for an aquarium filter is provided. The method includes rotating an impeller in an aquarium to draw water into the filter. The step of rotating the impeller includes rotating blades. Each blade includes opposite blade faces; a free edge; first and second opposite edges, with the blade faces being bordered by the first and second edges and the free edge; and a depression in each of the blade faces. The depressions aid in pushing the water.

A variety of additions aspects will be set forth in the description that follows. The aspects can relate to individual features and to combinations of features. It is to be understood that both the foregoing general description and the following detailed description are exemplary and explanatory only and are not restrictive of the broad inventive concepts upon which the examples disclosed herein are based.

DETAILED DESCRIPTION

Figure 1:
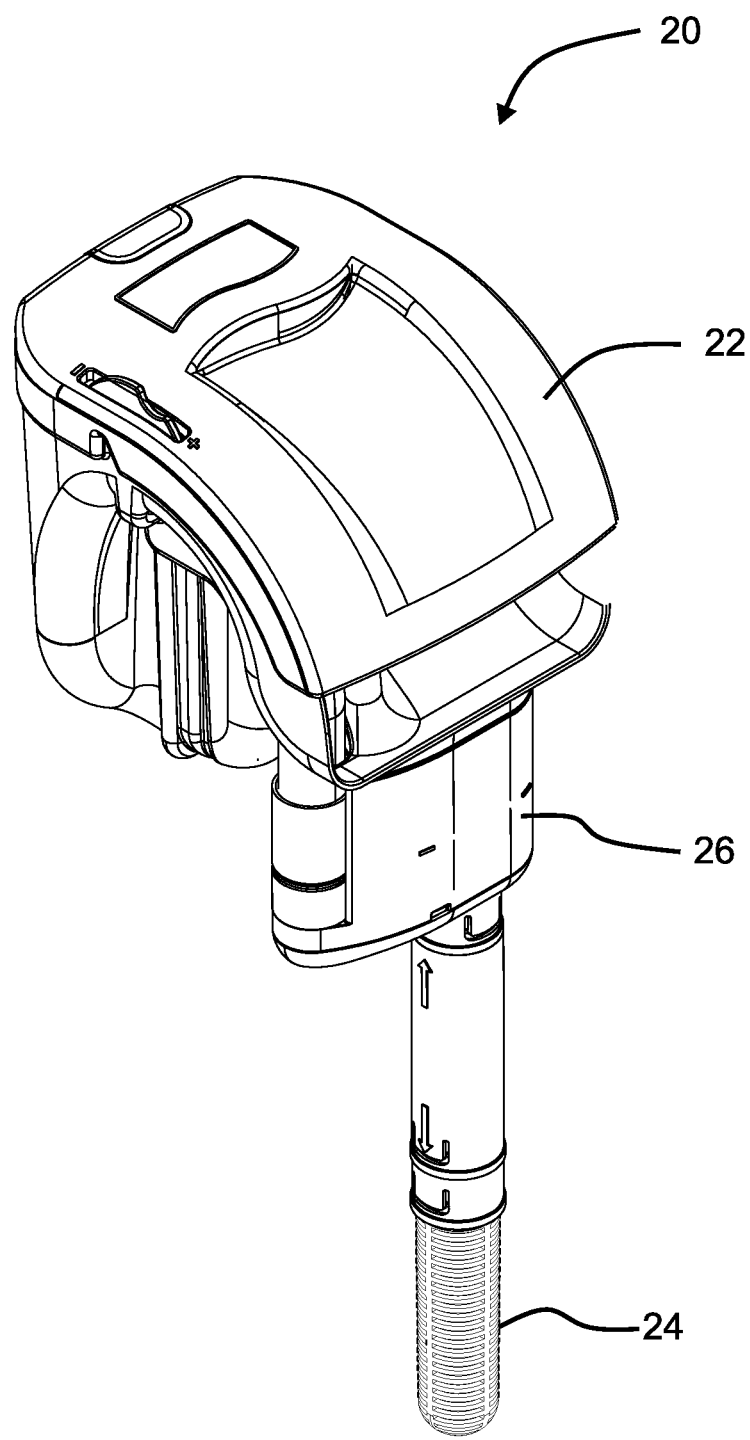
FIG. 1 is a front perspective view of a filter assembly for use with an aquarium having a pump, according to principles of this disclosure.

Various examples will be described in detail with reference to the drawings, wherein like reference numerals represent like parts and assemblies throughout the several views. Reference to various examples does not limit the scope of the claims attached hereto. Additionally, any examples set forth in this specification are not intended to be limiting and merely set forth some of the many possible examples for the appended claims. In the drawings, like reference numbers correspond to like or similar components throughout the several figures.

A. General Overview

FIG. 1 illustrates a filter assembly 20 usable with an aquarium in order to clean the water in an aquarium. The filter assembly 20 includes a filter housing 22, an intake tube assembly 24 and a pump assembly 26. When the pump assembly 26 is activated, water is drawn by the pump assembly 26 from an aquarium, through the intake tube assembly 24. The water is then moved through the pump assembly 26 and into the internal filter assembly components (not shown). The internal filter components clean the water and return the filter water back to the aquarium.

Figure 2:
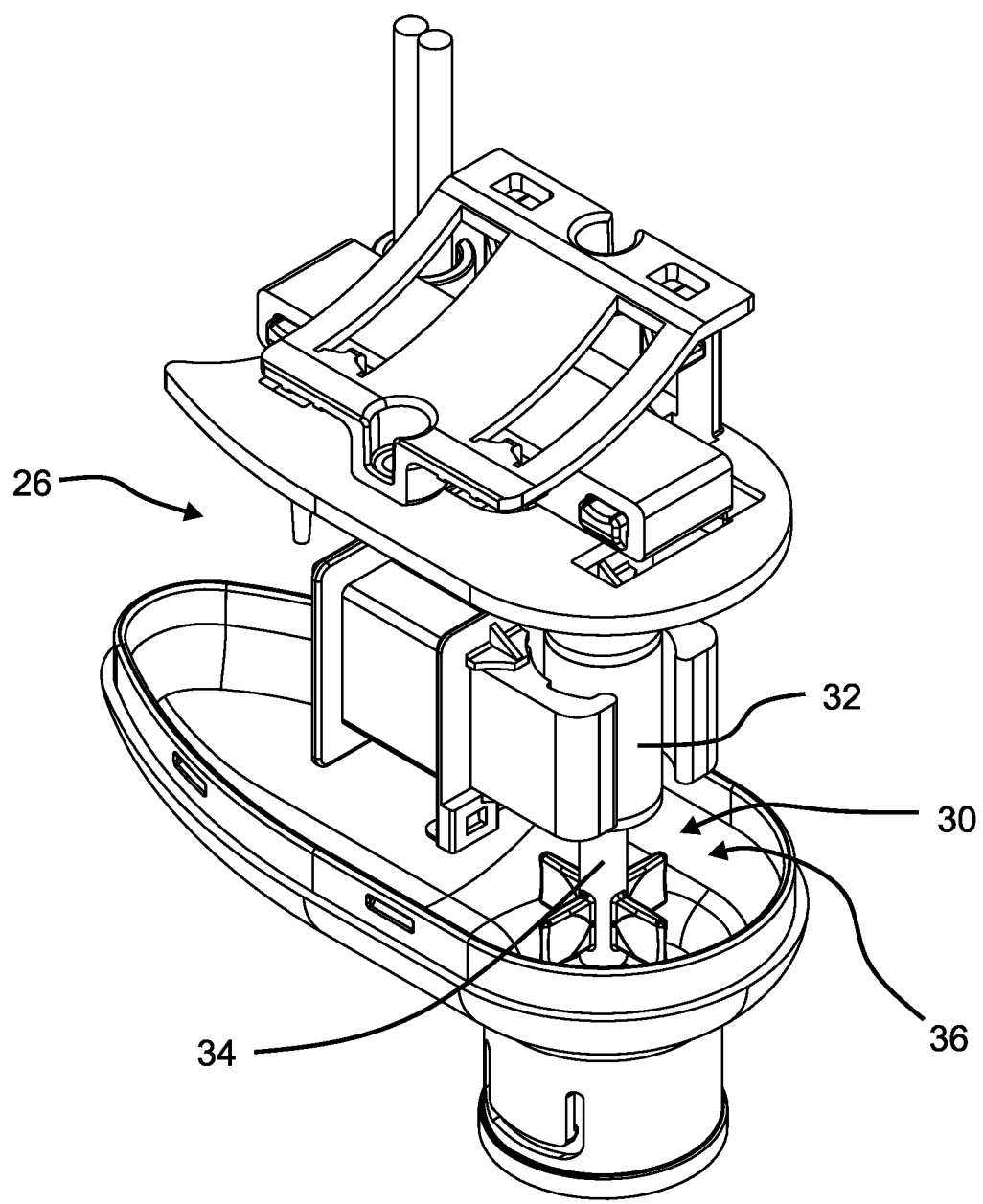
FIG. 2 is a front top perspective view of the pump assembly used in the filter assembly of FIG. 1, with portions removed for visibility, and showing an impeller assembly, constructed in accordance with principles of this disclosure.

FIG. 2 illustrates the pump assembly 26 with housing parts removed to show internal components. The pump assembly 26 includes an impeller assembly 30. The impeller assembly 30 includes a rotor 32 mounted on a shaft 34. Impeller 36 is also mounted on the shaft 34.

In general, when the pump motor (not shown) operates, a magnet attached to the motor spins, which causes a magnet in the rotor 32 to spin. This also causes the shaft 34 to spin, which spins the impeller 36. The spinning impeller 36 pushes water, which draws water in to the pump assembly 36 by drawing it through the intake tube assembly 24 from the aquarium.

B. Example First Embodiment of Impeller, FIGS. 3-6

A first example embodiment of impeller 36 is shown in FIGS. 3-6. The impeller 36 has shaft 34. The shaft 34 defines a longitudinal axis 38. In general, the impeller 36 rotates or spins about the axis 38, which is an axis of rotation.

The impeller 36 includes a plurality of impeller blades 40. While there should be at least two blades 40, there are typically no more than six blades. In this embodiment, there are four blades 40. The blades 40 radially extend from the shaft 34. In general, the blades 40 are located adjacent an end 42 of the shaft 34 opposite from a holding location 44 for the rotor 32.

Each of the blades 40 includes opposite blade faces 46, 47. In this embodiment, the blade faces 46, 47 are identical. In alternative arrangements, the faces 46, 47 would not need to be identical.

Each of the blades 40 includes a free edge 50. The free edge 50 is remote from the shaft 34 and joins the faces 46, 47. In this embodiment, the free edge 50 is straight and generally parallels the longitudinal axis 38 of the shaft 34.

Each of the blades 40 includes a first edge 52 extending from the shaft 34 to the free edge 50. Opposite of the first edge 52 is a second edge 54 extending from the shaft 34 to the free edge 50. In this embodiment, the first edge 52 and second edge 54 are generally straight and parallel to each other. The first edge 52 and second edge 54 are also generally perpendicular to the central axis 38 of the shaft 34.

Figure 3:
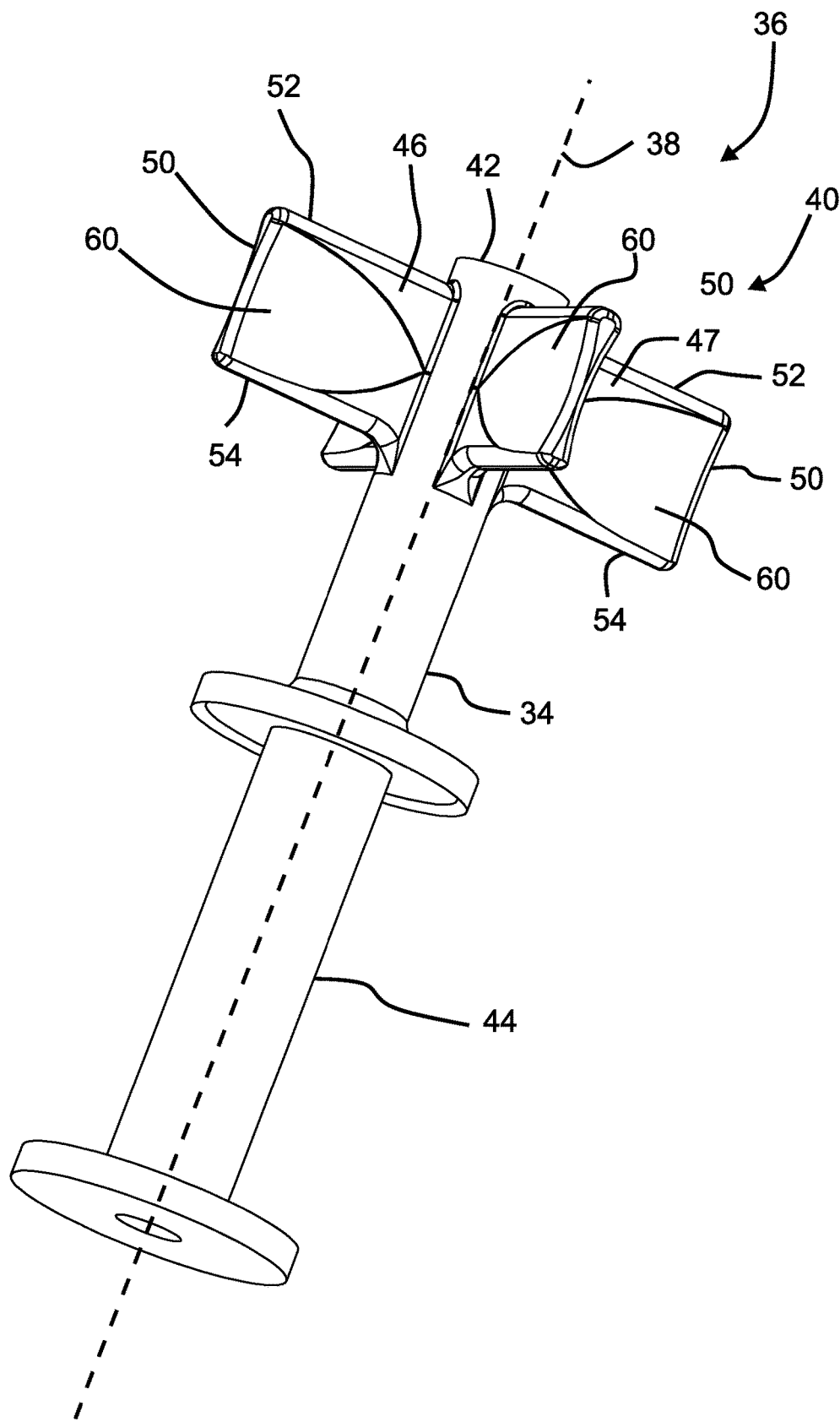
FIG. 3 is a perspective view of a first embodiment of an impeller usable in the pump assembly of FIG. 2, constructed in accordance with principles of this disclosure.
Figure 4:
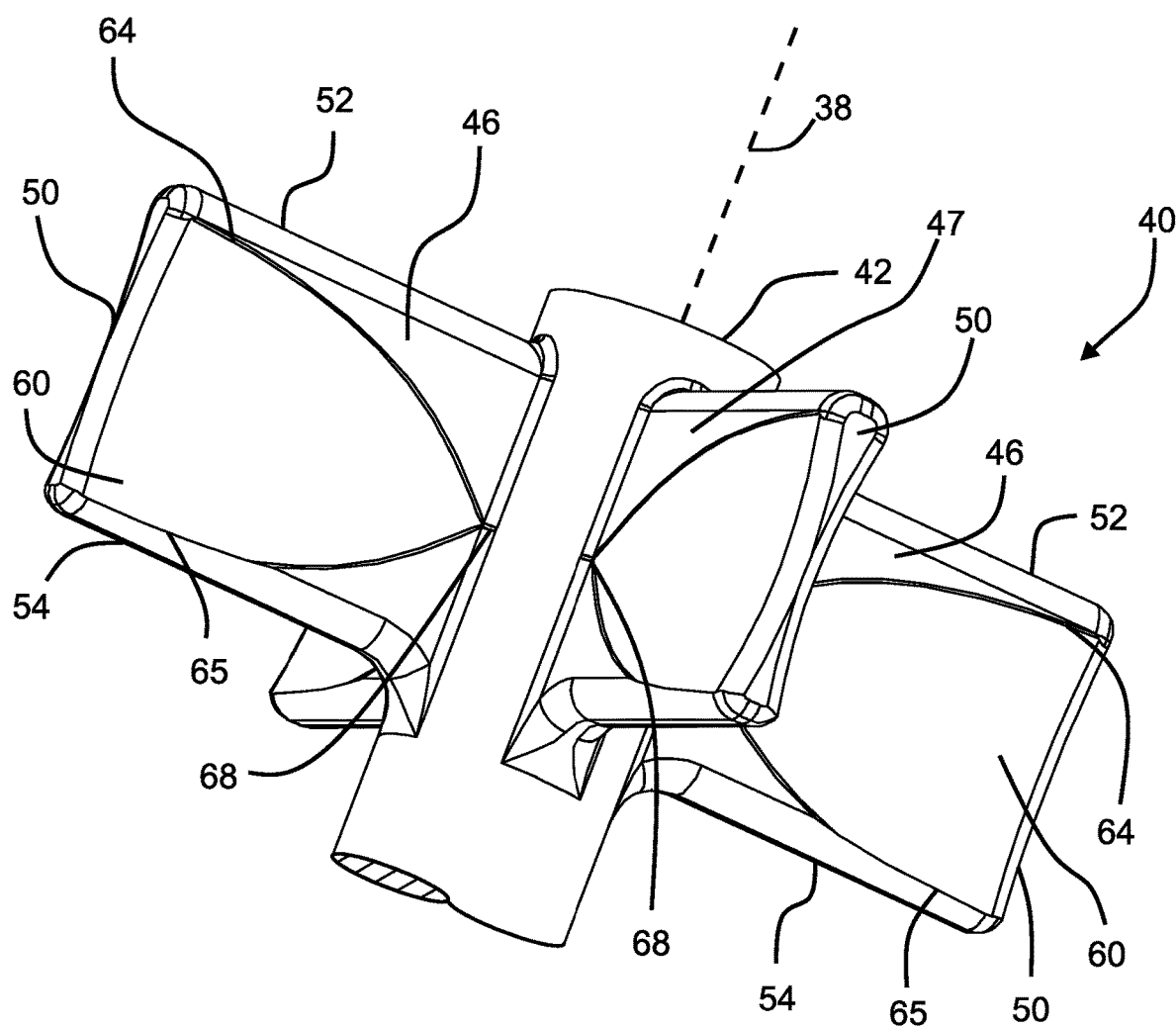
FIG. 4 is an enlarged view of a portion of the impeller of FIG. 3.
Figure 5:
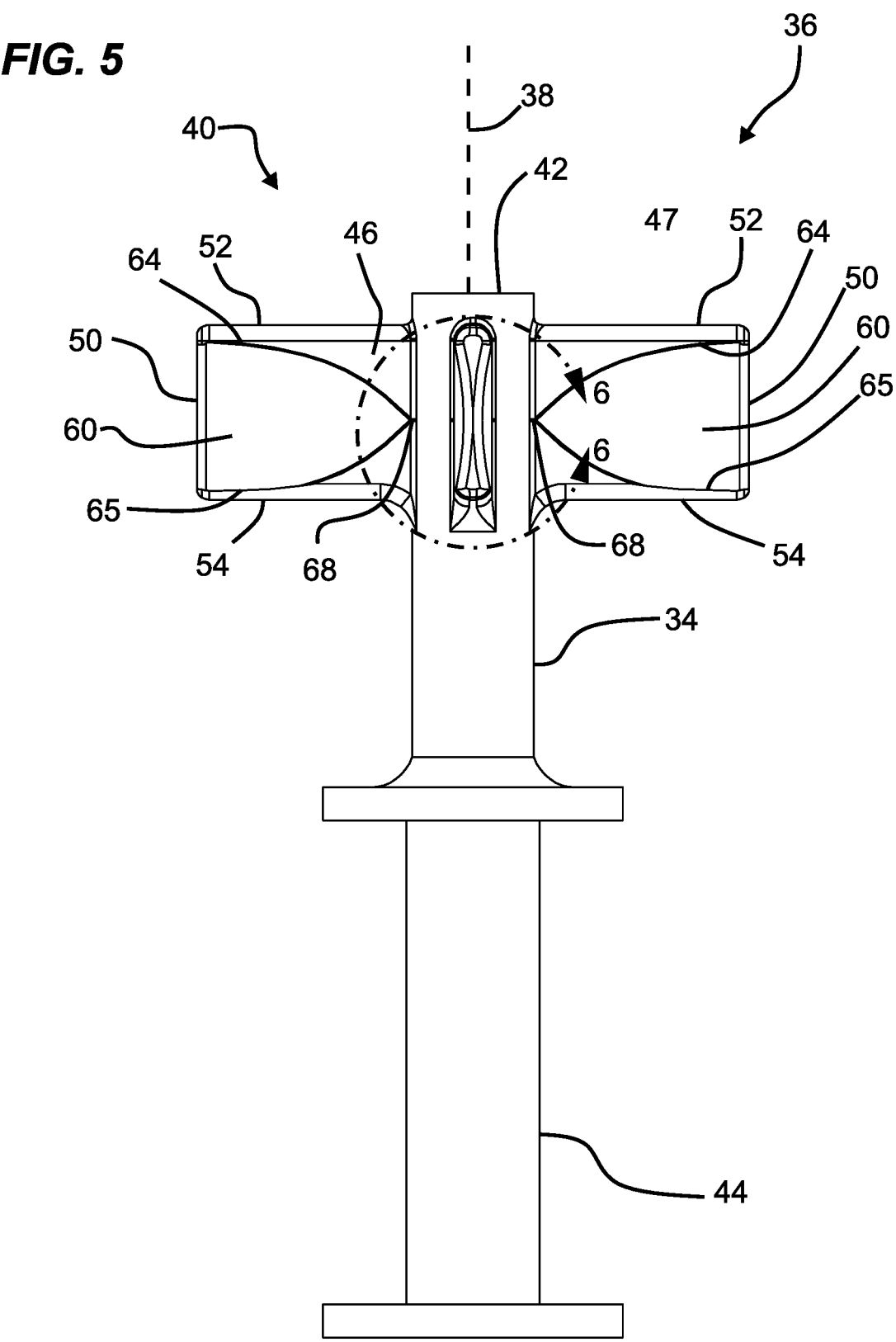
FIG. 5 is a front view of the impeller of FIG. 3.
Figure 6:
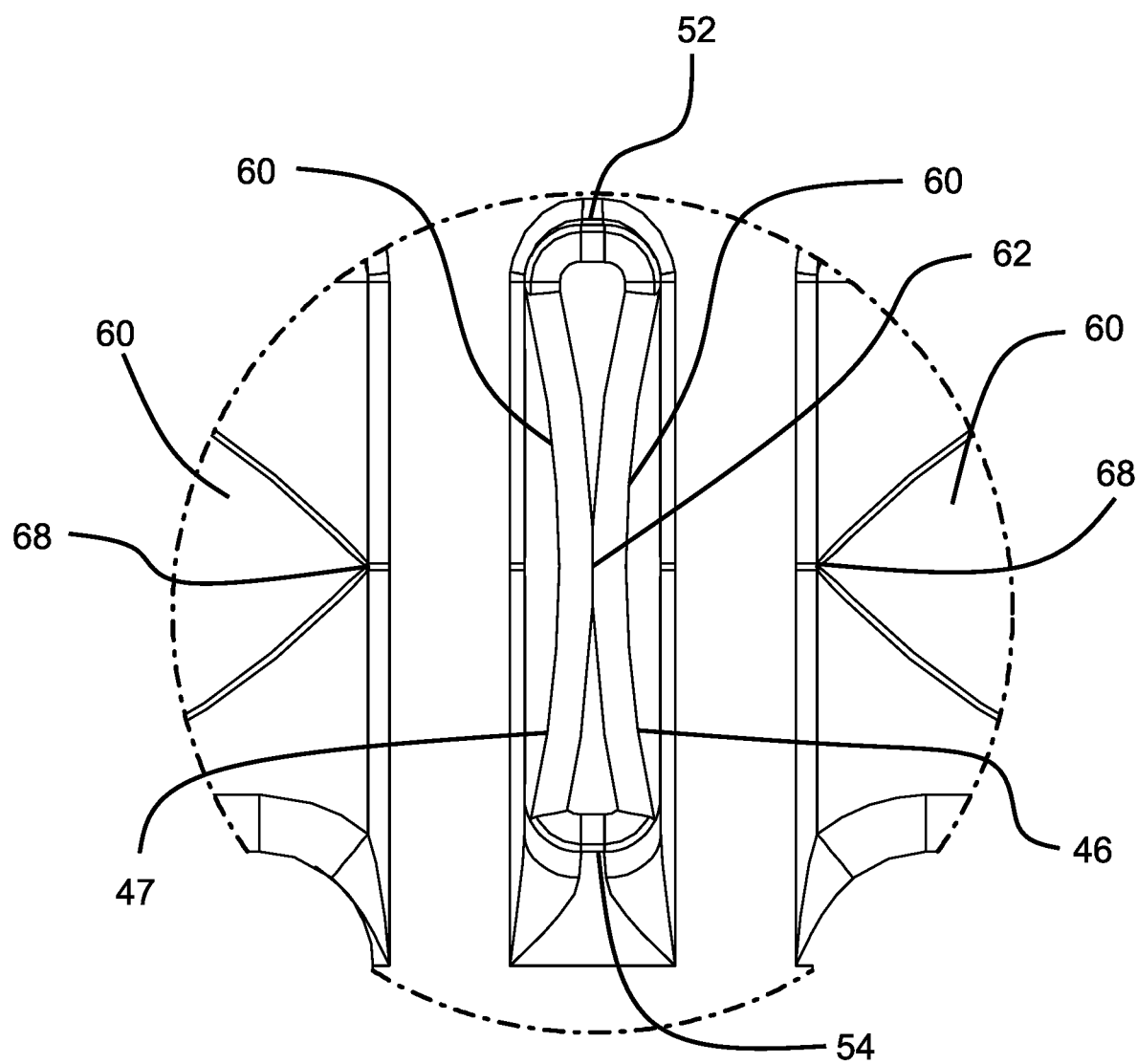
FIG. 6 is an enlarged view of portions 6-6 of FIG. 5.
Figure 7:
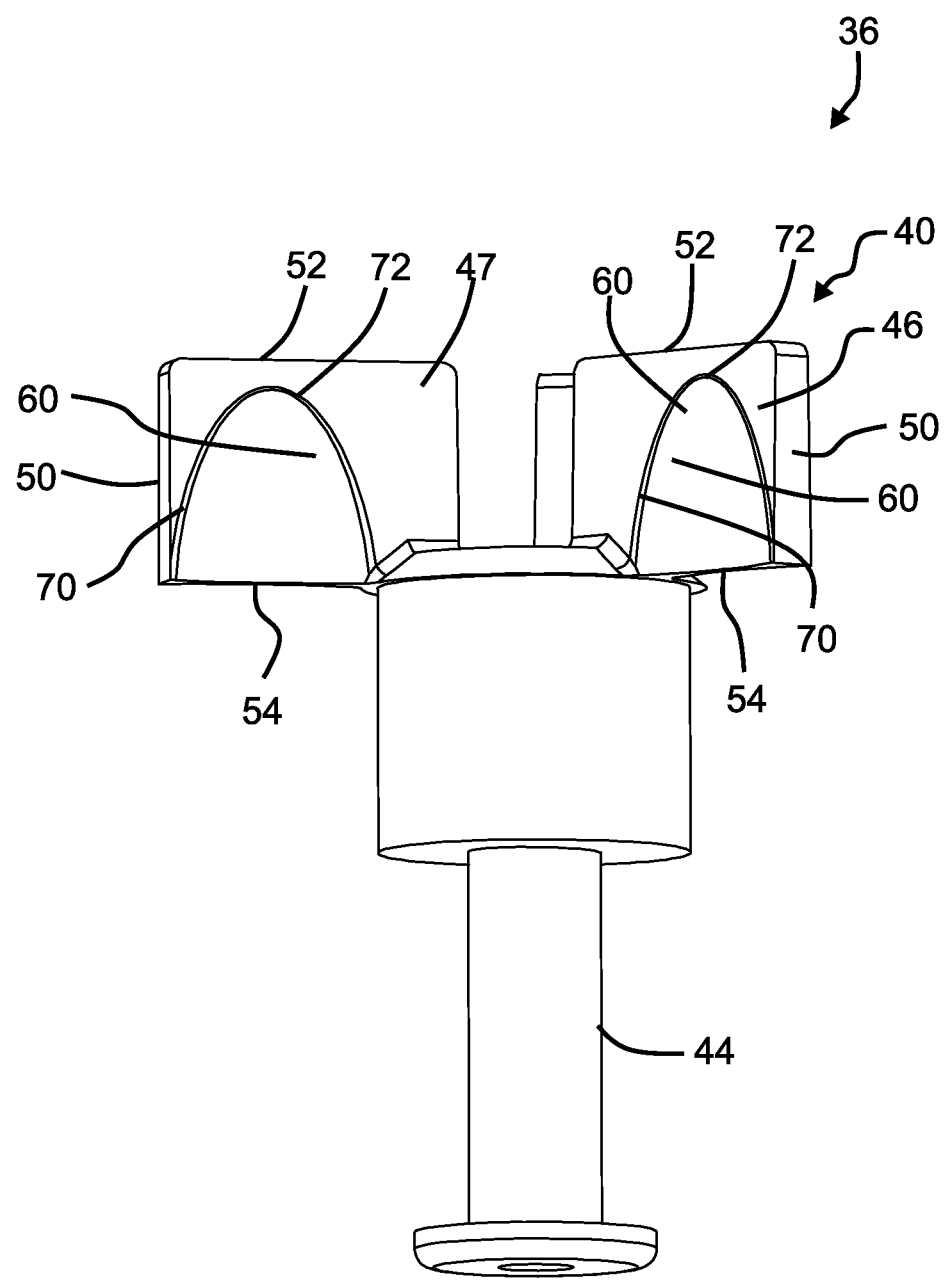
FIG. 7 is a perspective view of a second embodiment of an impeller usable in the pump assembly of FIG. 2, constructed in accordance with principles of this disclosure.
Figure 8:
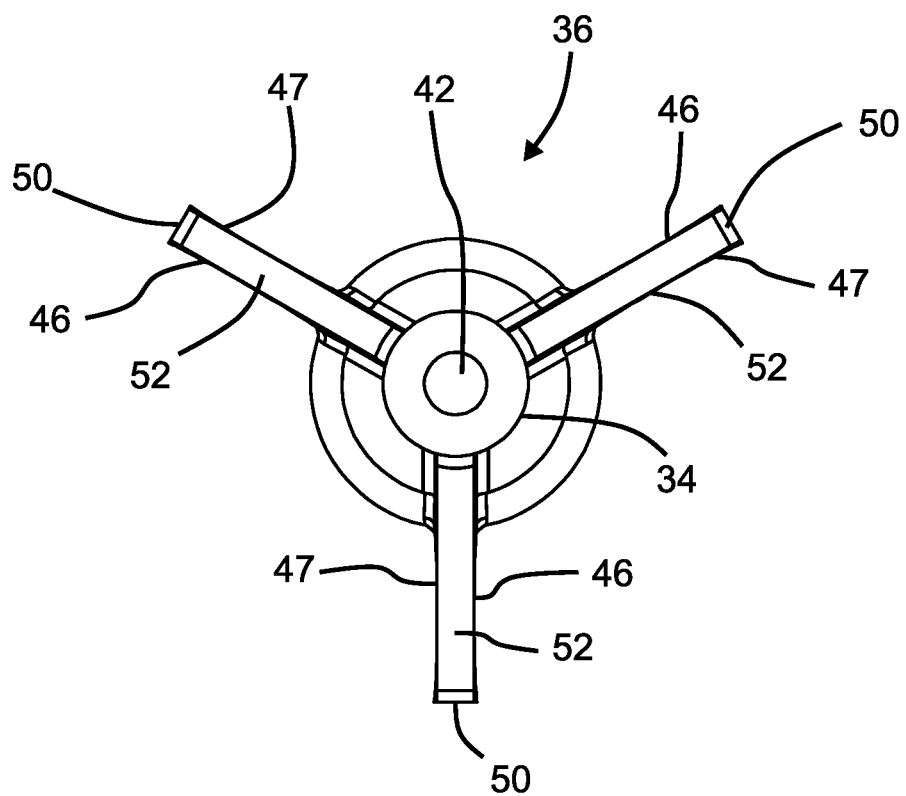
FIG. 8 is a top view of the impeller of FIG. 7.
Figure 9:
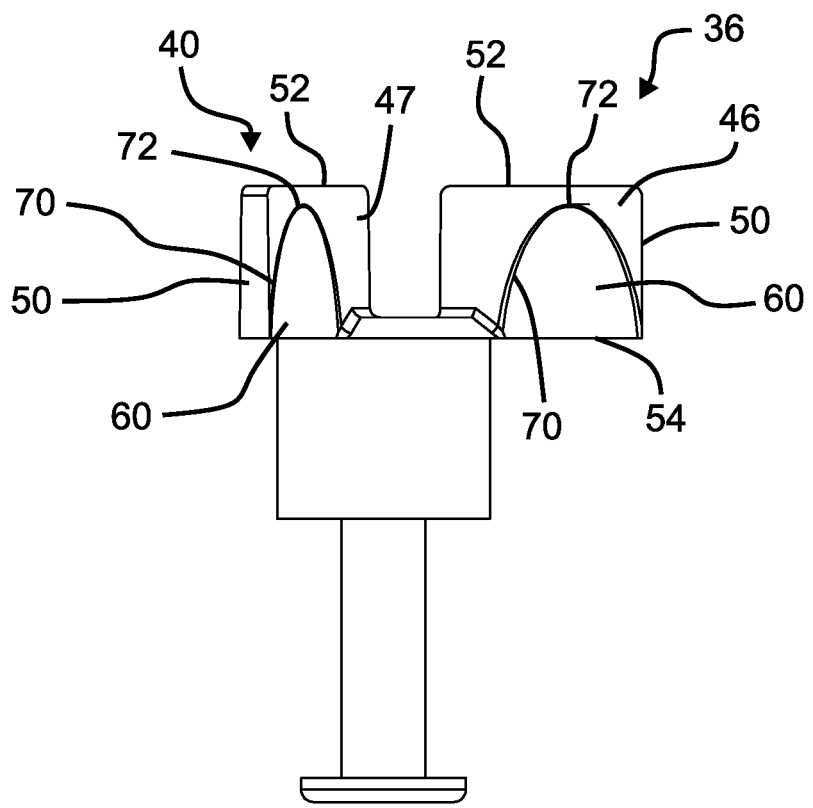
FIG. 9 is a front view of the impeller of FIG. 7.
Figure 10:
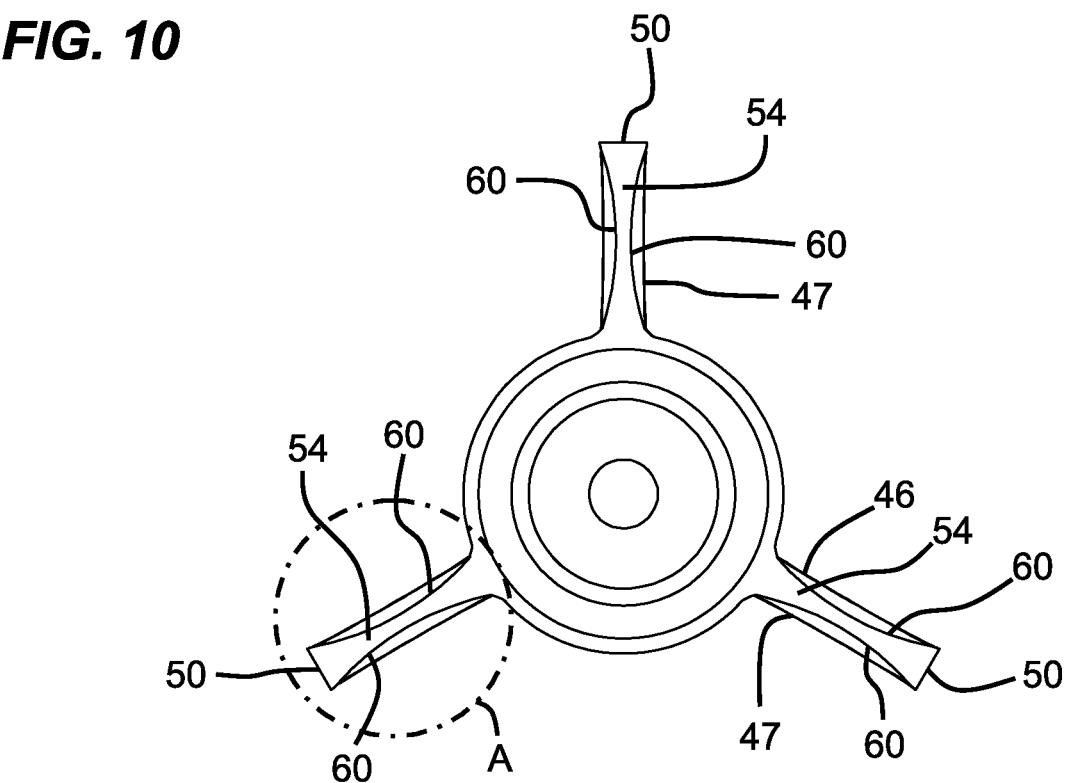
FIG. 10 is a bottom view of the impeller of FIG. 7.

By reviewing FIGS. 3 and 4, it can be appreciated that each of the blade faces 46, 47 are bordered by the first and second edges 52, 54 and the free edge 50.

In accordance with principles of this disclosure, each of the blade faces 46, 47 includes at least one depression 60. The depressions 60 provide an advantage over impellers that do not have blades with depressions. For example, the depressions 60 in the blades 40 provide increased flow rates over conventional flat blade impellers. The depressions 60 increase the water volume pushed by the blades 40, which results in a greater flow rate over conventional flat blades. This allows for increased flow rates without increasing the impeller size, which allows for compact impeller designs.

In general, the depression 60 in each of the blade faces 46, 47 has a maximum depth along one of the edges 50, 52, 54. The deepest portion of the depression 60 is also the location on the blade face 46, 47 that is the thinnest portion of the respective face 46, 47.

In the embodiment of FIGS. 3-6, the free edge 50 is the deepest portion of the depression 60. This can be seen in, for example, FIG. 6, which shows an end view of one of the blades 40, and the free edge 50 is visible in plan view. The depression 60 can be seen as curving from an area of largest depth adjacent the first edge 52 and second edge 54 to a middle section 62 halfway between the first edge 52 and second edge 54 and along the free edge 50. This middle section 52 is also the deepest portion of the depression 60.

In the embodiment of FIGS. 3-6, the depression 60 has an outer periphery with a shape of two opposite parallel sections 64, 65 which then extend toward each other until ending at a vertex portion or region 68. The periphery of the depression 60 can generally round from the parallel sections 64, 65 and end at the vertex region 68, which can be a rounded section or a sharp point. The vertex region 68 is adjacent to the shaft 34, while the parallel sections 64, 65 are adjacent to the first and second edges 52, 54. The free edge 50 is the deepest part of the depression and halfway between the parallel sections 64, 65.

C. Example Second Embodiment of Impeller, FIGS. 7-11

FIGS. 7-11 illustrate a second embodiment of impeller 36. Similar reference numbers have similar parts as the first embodiment, and a description of those parts is not repeated here but is incorporated herein by reference.

In this embodiment, there are three blades 40.

Figure 11:
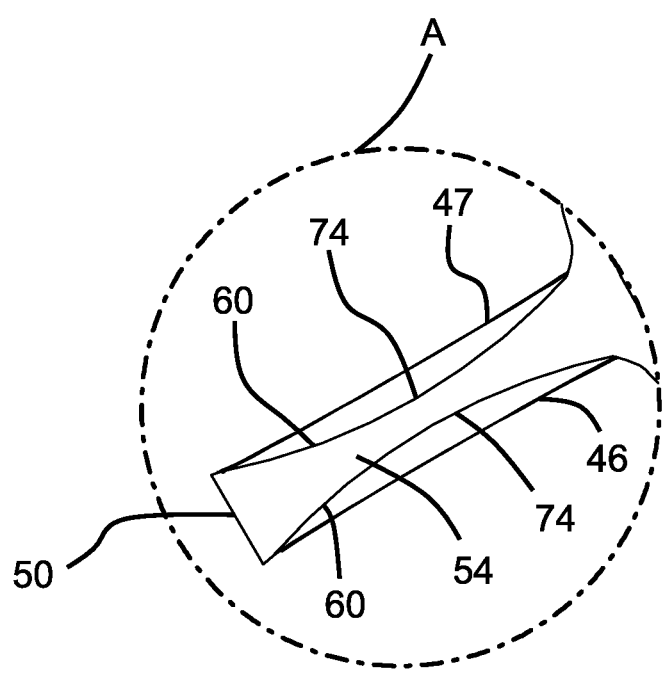
FIG. 11 one of the blades shown at portion A of FIG. 10.
Figure 12:
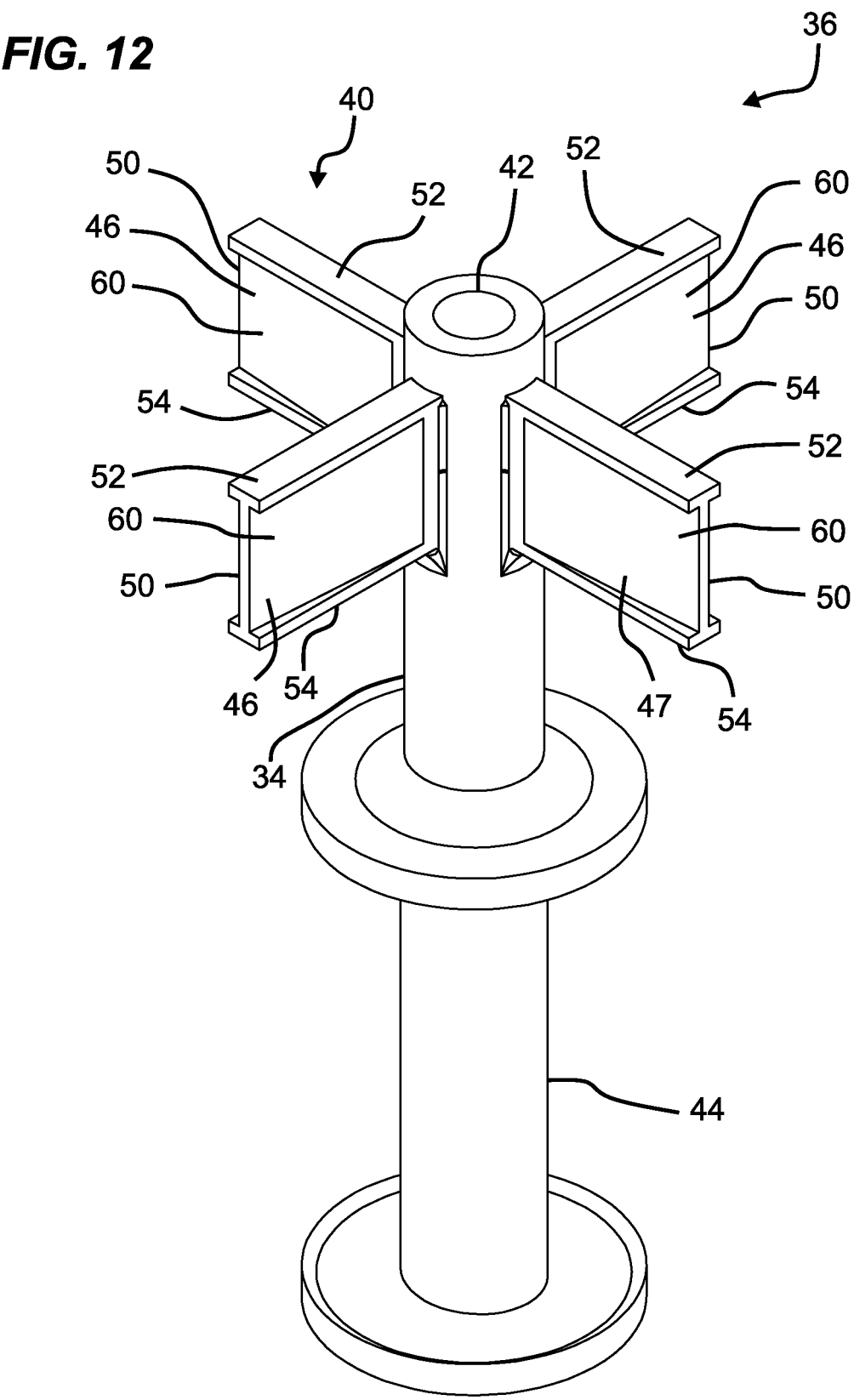
FIG. 12 is a perspective view of a third embodiment of an impeller usable with the pump assembly of FIG. 2.
Figure 13:
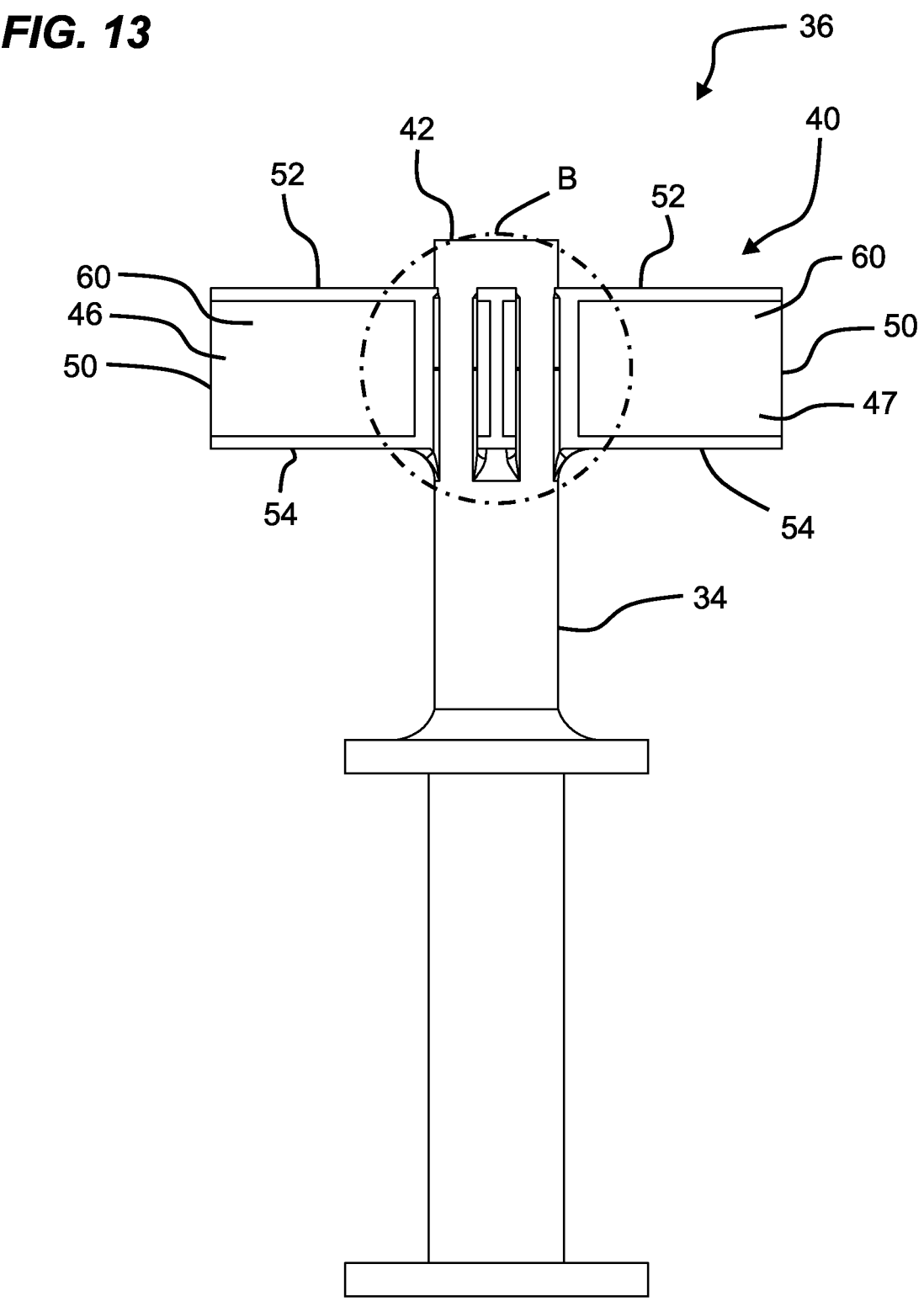
FIG. 13 is a front view of the impeller of FIG. 12.
Figure 14:
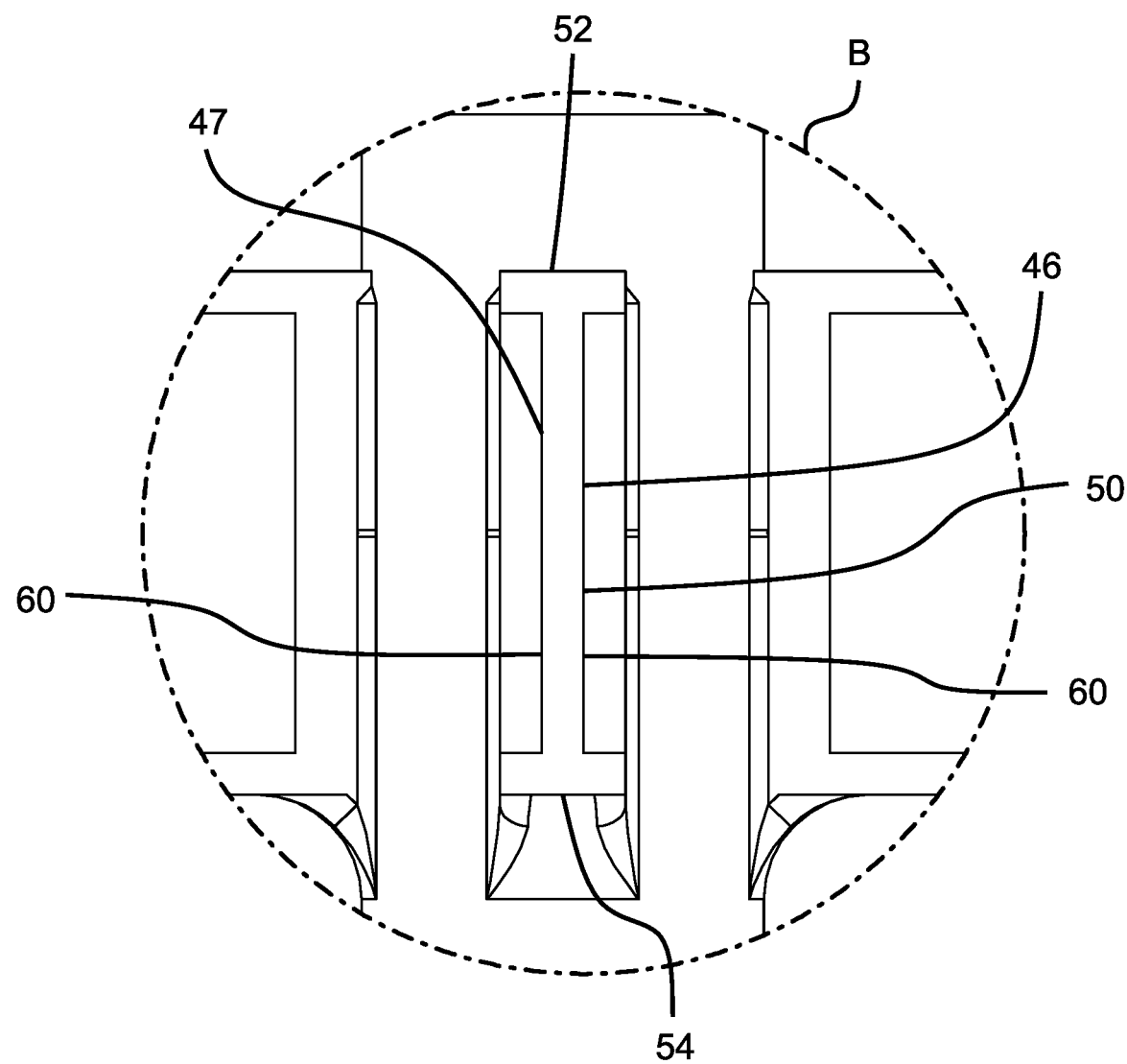
FIG. 14 is an enlarged view of portion B of FIG. 13.

In this embodiment, the depression 60 has a maximum depth along the second edge 54. The depression 60 has a periphery forming a curved shape 70 with a vertex portion 72. The vertex portion 72 is adjacent the first edge 52, while the second edge 54 is a deepest portion of the depression 60. In FIG. 11, the second edge 54 is shown in plan view. The deepest portion 74 of the depression 60 can be seen to be halfway between the free edge 50 and where the blade 40 secures to a remaining portion of the impeller 36 at the shaft 34. In general, in this embodiment, the curved shaped 70 can be viewed as parabolic; or generally a section (such as a half or quarter section) of an oval.

D. Example Third Embodiment of Impeller, FIGS. 12-15

FIGS. 12-15 illustrate a third embodiment of impeller 36. Again, like numbers represent like parts, and the descriptions of those parts are not repeated here but are incorporated herein by reference.

Figure 15:
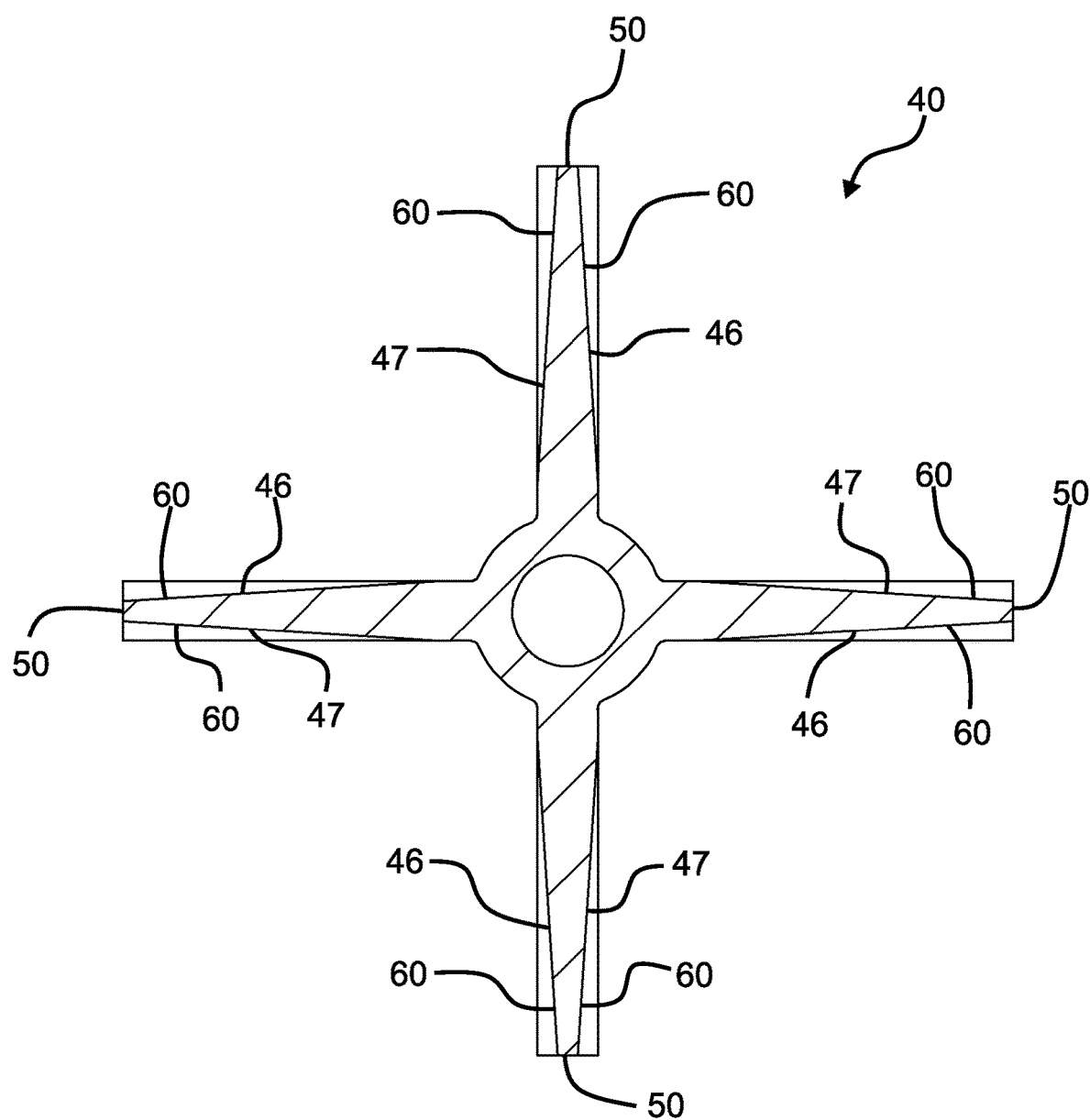
FIG. 15 is a cross-sectional view of the impeller of FIG. 12.

In this embodiment, there are four blades 40. The depression 60 in each of the blade faces 46, 47 increases in depth as the depression 60 extends from adjacent the shaft 34 to the free edge 50. In other words, the blades 40 are thickest along the region adjacent to the shaft 34 and are thinnest along the free edge 50. In between the free edge 50 and the shaft 34, the blades gradually increase in thickness. This results in the depression 60 having the greatest depth along the free edge 50 as can be seen in FIG. 15.

In this embodiment, the overall free edge 50 forms the cross section in the shape of an I, since the first edge 52 and second edge 54 protrude outwardly beyond the faces 46, 47 at the regions of depression 60.

E. Example Method

The impeller assembly 30 can be used as part of a method of pumping water for an aquarium filter. The method includes rotating the impeller 36 in an aquarium to draw water into the filter. The step of rotating the impeller 36 includes rotating blades 40. Each blade 40 includes opposite blade faces 46, 47. Each of the blade faces 46, 47 has depression 60, in which the depression 60 aids in pushing the water.

The above represents example principles. Many embodiments can be made using these principles.

I claim:

1. A method of pumping water for an aquarium filter; the method comprising:
   (a) rotating an impeller in an aquarium to draw water into the filter; and
   (b) wherein the step of rotating the impeller includes rotating blades, each blade including:
      (i) opposite blade faces;
      (ii) a free edge;
      (iii) first and second opposite edges extending to the free edge; the blade faces being bordered by the first and second edges and the free edge;
      (iii) each of the blades having a thickness defined between the opposite blade faces; the thickness being non-constant and including a region of smallest thickness and one or more regions of maximum thickness;
         (A) the region of smallest thickness being at the free edge; the thickness increasing along the blade from said free edge;
         (B) remaining ones of the first edge, and second edge having the maximum thickness; and
         (C) the free edge forming an I-shaped cross-section.

2. The method of claim 1 wherein the free edge, first edge, and second edge are straight edges, and the first edge and second edge protrude outwardly beyond the each of the blade faces.

3. The method of claim 1 wherein there are no more than 4 blades.

4. The method of claim 1 wherein there are at least 3 blades and no more than 4 blades.

5. A method of pumping water for an aquarium filter; the method comprising:
   (a) providing a shaft with a longitudinal axis and a rotor mounted on the shaft;
   (b) rotating an impeller in an aquarium to draw water into the filter; and
   (c) wherein the step of rotating the impeller includes rotating at least 3 blades radially extending from the shaft, each blade:
      (i) being along a plane containing the longitudinal axis of the shaft;
      (ii) having an opposite blade face; a free edge remote from the shaft; and first and second opposite edges extending from the shaft to the free edge; the blade faces being bordered by the first and second edges and the free edge;
      (iii) having a thickness defined between the opposite blade faces; the thickness being non-constant and including a region of smallest thickness and one or more regions of maximum thickness;
         (A) the region of smallest thickness being at the free edge; the thickness increasing along the blade from said free edge to the shaft;
         (B) remaining ones of the first edge, and second edge having the maximum thickness; and
         (C) the free edge forming an I-shaped cross-section.

6. The method of claim 5 wherein the free edge, first edge, and second edge are straight edges, and the first edge and second edge protrude outwardly beyond each of the blade faces.

7. A method of pumping water for an aquarium filter; the method comprising:
   (a) providing a shaft with a longitudinal axis and a rotor mounted on the shaft;
   (b) rotating an impeller in an aquarium to draw water into the filter; and
   (c) wherein the step of rotating the impeller includes rotating blades radially extending from the shaft, each of the impeller blades including:
      (i) opposite blade faces;
      (ii) a free edge remote from the shaft;
      (iii) first and second opposite edges extending from the shaft to the free edge; the blade faces being bordered by the first and second edges and the free edge;
      (iii) each of the blades having a thickness defined between the opposite blade faces; the thickness being non-constant and including a region of smallest thickness and one or more regions of maximum thickness;
         (A) the region of smallest thickness being at the free edge; the thickness increasing along the blade from said free edge and toward the first edge and second edge;
         (B) the first edge and second edge having the maximum thickness; and
         (C) wherein each of the blade faces includes a depression having two opposite parallel sections that round to a vertex portion.

8. The method of claim 7 wherein:
   (a) the shaft has a longitudinal axis;
   (b) each of the blades has a plane containing the first and second edges; and each of the planes also contains the longitudinal axis of the shaft.

9. A method of pumping water for an aquarium filter; the method comprising:
   (a) providing a shaft with a longitudinal axis and a rotor mounted on the shaft;

(b) rotating an impeller in an aquarium to draw water into the filter; and
(c) wherein the step of rotating the impeller includes rotating blades radially extending from the shaft, each of the impeller blades including:
  (i) opposite blade faces;
  (ii) a free edge remote from the shaft;
  (iii) first and second opposite edges extending from the shaft to the free edge; the blade faces being bordered by the first and second edges and the free edge;
  (iii) each of the blades having a thickness defined between the opposite blade faces; the thickness being non-constant and including a region of smallest thickness and one or more regions of maximum thickness;
    (A) the region of smallest thickness is along the second edge halfway between the free edge and the shaft; the thickness increasing along the blade from said second edge; and
    (B) remaining ones of the free edge and first edge having the maximum thickness.

10. The method of claim 9 wherein:
(a) the shaft has a longitudinal axis;
(b) each of the blades has a plane containing the first and second edges; and each of the planes also contains the longitudinal axis of the shaft.

11. A method of pumping water for an aquarium filter; the method comprising:
(a) providing a shaft with a longitudinal axis and a rotor mounted on the shaft;
(b) rotating an impeller in an aquarium to draw water into the filter; and
(c) wherein the step of rotating the impeller includes rotating at least 3 blades radially extending from the shaft, each blade:
  (i) being along a plane containing the longitudinal axis of the shaft;
  (ii) having an opposite blade face; a free edge remote from the shaft; and first and second opposite edges extending from the shaft to the free edge; the blade faces being bordered by the first and second edges and the free edge;
  (iii) having a thickness defined between the opposite blade faces; the thickness being non-constant and including a region of smallest thickness and one or more regions of maximum thickness;
    (A) the region of smallest thickness being along the second edge halfway between the free edge and the shaft; the thickness increasing along the blade from said second edge; and
    (B) remaining ones of the free edge and first edge having the maximum thickness.

12. The method of claim 11 wherein:
(a) the shaft has a longitudinal axis;
(b) each of the blades has a plane containing the first and second edges; and each of the planes also contains the longitudinal axis of the shaft.

* * * * *